United States Patent
Hall et al.

(10) Patent No.: US 8,679,447 B2
(45) Date of Patent: Mar. 25, 2014

(54) PROCESS FOR PRODUCING SULFUR DIOXIDE AND SULFUR TRIOXIDE

(75) Inventors: Tyson J. Hall, Baton Rouge, LA (US); Jason M. Selzer, Baton Rouge, LA (US); Utkarsh R. Vasaiwala, Baton Rouge, LA (US)

(73) Assignee: Albemarle Corporation, Richmond, VA (US)

( * ) Notice: Subject to any disclaimer, the term of this patent is extended or adjusted under 35 U.S.C. 154(b) by 0 days.

(21) Appl. No.: 13/976,685

(22) PCT Filed: Jan. 4, 2012

(86) PCT No.: PCT/US2012/020214
§ 371 (c)(1),
(2), (4) Date: Jun. 27, 2013

(87) PCT Pub. No.: WO2012/096817
PCT Pub. Date: Jul. 19, 2012

(65) Prior Publication Data
US 2013/0295001 A1    Nov. 7, 2013

Related U.S. Application Data

(60) Provisional application No. 61/431,705, filed on Jan. 11, 2011.

(51) Int. Cl.
   *C01B 17/54*      (2006.01)
   *C01B 17/74*      (2006.01)
   *C01B 17/80*      (2006.01)
   *F23C 1/00*      (2006.01)

(52) U.S. Cl.
   USPC ........... 423/532; 423/533; 423/539; 423/542; 423/543; 110/260; 110/338; 431/356

(58) Field of Classification Search
   USPC .......... 423/532, 533, 539, 542, 543; 110/260, 110/338; 431/356
   See application file for complete search history.

(56) References Cited

U.S. PATENT DOCUMENTS

| | | |
|---|---|---|
| 2,030,885 A | 2/1936 | Maxim |
| 3,671,194 A | 6/1972 | Roberts |

(Continued)

FOREIGN PATENT DOCUMENTS

| | | |
|---|---|---|
| EP | 0002737 B1 | 7/1979 |
| EP | 1262451 A2 | 12/2002 |

(Continued)

OTHER PUBLICATIONS

Pang, T., et al., "New sulphuric acid process from China", Sulphuric Acid Technology, Sulphur, 327, Mar.-Apr. 2010, pp. 44-47.

(Continued)

*Primary Examiner* — Timothy Vanoy
(74) *Attorney, Agent, or Firm* — James A. Jubinsky

(57) ABSTRACT

$SO_3$ is formed from a replenished circulating inventory of fresh and recycled $SO_2$. Also, a feed stream of replenished $SO_2$ is heated by indirect heat exchange with a hot stream of $SO_2$ and $SO_3$ whereby the hot stream is cooled for separating the two gases. The heated feed stream of replenished $SO_2$ serves as a hot gaseous feed to a sulfur burner. This $SO_2$ feed is divided into two feed streams, one being oxygenated with pure oxygen and the other remains as an $SO_2$ feed. These feeds plus a feed of molten sulfur are concurrently and separately introduced into the sulfur burner where additional $SO_2$ is formed via continuous exothermic reaction. Although heated, the oxygenated feed(s) of $SO_2$ bring in the needed oxygen for the reaction and the feeds of the oxygenated and non-oxygenated $SO_2$ serve as a heat sink in the sulfur burner to reduce the temperature therein.

20 Claims, 4 Drawing Sheets

(56) References Cited

U.S. PATENT DOCUMENTS

| | | | |
|---|---|---|---|
| 3,793,230 A | 2/1974 | Dorn et al. | |
| 3,803,298 A | 4/1974 | Guth et al. | |
| 3,993,429 A | 11/1976 | Archer | |
| 4,046,866 A | 9/1977 | Hurlburt et al. | |
| 4,152,407 A | 5/1979 | Fuchs | |
| 4,285,927 A | 8/1981 | Hara et al. | |
| 4,578,262 A | 3/1986 | Cameron | |
| 4,807,542 A | 2/1989 | Dykema | |
| 4,966,757 A | 10/1990 | Lewis et al. | |
| 5,194,239 A | 3/1993 | Masseling et al. | |
| 5,503,821 A | 4/1996 | McAlister et al. | |
| 6,279,514 B1 | 8/2001 | Browder et al. | |
| 6,448,198 B1 | 9/2002 | Szabo et al. | |
| 6,875,413 B2 | 4/2005 | Perez Garcia | |
| 7,052,670 B2 | 5/2006 | Labrana Valdivia et al. | |
| 8,043,597 B2 * | 10/2011 | Daum et al. | 423/543 |
| 2004/0086451 A1 | 5/2004 | Labrana Valdivia et al. | |
| 2005/0103685 A1 | 5/2005 | Watanabe et al. | |
| 2007/0260072 A1 | 11/2007 | Harrod et al. | |
| 2009/0139137 A1 | 6/2009 | Ikura et al. | |

FOREIGN PATENT DOCUMENTS

| | | |
|---|---|---|
| GB | 858939 | 1/1961 |
| GB | 939805 | 10/1963 |
| GB | 996480 | 6/1965 |
| SU | 1469266 A1 | 3/1989 |
| WO | 01/36324 A2 | 5/2001 |
| WO | 2007/090671 A2 | 8/2007 |

OTHER PUBLICATIONS

Sulphuric Acid on the Web, Knowledge for the Sulphuric Acid Industry, Sulphur-Burning—Sulphur Furnace, DKL Engineering, Inc., Mar. 2002, Website, http://www.sulphuric-acid.com/techmanual/sulphurburning/furnace/htm, Visited Sep. 23, 2013, 2 pages.

* cited by examiner

US 8,679,447 B2

PROCESS FOR PRODUCING SULFUR DIOXIDE AND SULFUR TRIOXIDE

REFERENCE TO RELATED APPLICATIONS

This application is the National Stage of International Patent Appln. No. PCT/US2012/020214 filed on Jan. 4, 2012, which in turn claims the benefit of U.S. Provisional Patent Appl. No. 61/431,705, filed on Jan. 11, 2011, the disclosures of which are incorporated herein by reference.

BACKGROUND

Various processes are known for producing sulfur dioxide ($SO_2$) and sulfur trioxide ($SO_3$). Typically the known processes require significant capital outlays because of the very high temperatures involved in the exothermic reaction between sulfur and air or oxygen to form sulfur dioxide. While various methods of reducing the temperatures incurred in the process have been proposed, such methods usually involve complicated, relatively expensive equipment. Most $SO_2$, $SO_3$, and sulfuric acid ($H_2SO_4$) plants use air to dilute and reduce the exotherm. Such plants require expensive nitrogen separation and scrubbing equipment. If air is omitted from the process, production of $SO_2$, $SO_3$, and $H_2SO_4$ would require sulfur burners with a high temperature operating zone. Because of the operating temperatures of the burners, existing plants require refractory lined after-coolers and/or waste heat boilers. In addition, oftentimes excess gases need to be removed from the gaseous sulfur trioxide products and scrubbed to remove impurities. In some cases, complicated and expensive automated recycling systems are required in previously proposed processes.

A relatively small installation used heretofore for producing $SO_3$ from $SO_2$ is schematically depicted in FIG. 3. Unfortunately, such an installation is limited to the availability of "over the fence" source(s) of $SO_2$ raw material. Therefore the continued ability to produce $SO_3$ is heavily dependent on local sources of economical $SO_2$. Attempts to operate the plants such as depicted in FIG. 3 at overcapacity involving higher-than-designed throughputs from spot sources of $SO_2$ becomes uneconomical. To meet the necessary needs from $SO_3$ then becomes dependent upon purchases of $SO_3$ from outside sources which also can be an uneconomical way of operating.

BRIEF NON-LIMITING SUMMARY OF THE INVENTION

Pursuant to this invention new process technology has been found which enables the production of sulfur dioxide ($SO_2$) and sulfur trioxide ($SO_3$) avoiding the need for complicated and expensive equipment required for producing these products. This, in turn, reduces the need for substantial capital expenditures when producing industrial sized plants for producing sulfur dioxide and sulfur trioxide from elemental sulfur. The $SO_2$ generated in the practice of this invention is completely used in the process along with makeup fresh $SO_2$ from an external source thereby reducing a raw material cost. Moreover, the design of preferred process embodiments of this invention enable the designed capacity of the output of the $SO_3$ from the plant facilities to be readily and inexpensively increased by 50% by a simple add-on system.

In one of the embodiments of this invention a continuously replenished circulating inventory of fresh and recycle sulfur dioxide is utilized in continuously forming $SO_3$. Another of the features of this embodiment is the heating of a feed stream of replenished $SO_2$ by heat exchange with a hot stream of $SO_2$ and $SO_3$ formed in the process whereby the hot stream is cooled for separation of the two gases and the feed stream of replenished $SO_2$ achieves a suitable temperature to serve as a hot gaseous feed to a sulfur burner. This heated gaseous feed of $SO_2$ is divided into at least two feed streams, at least one of which is oxygenated by receipt of a feed of pure oxygen and another of which remains as a feed of $SO_2$. These feeds plus at least one feed of molten sulfur are concurrently and separately introduced into the sulfur burner in which additional $SO_2$ is formed via a continuous exothermic reaction. Additionally, although heated, the oxygenated feed(s) of $SO_2$ bring in the needed oxygen for the reaction and the feeds of the oxygenated and non-oxygenated $SO_2$ serve as a heat sink in the sulfur burner to reduce the temperature of the otherwise very hot exothermic reaction.

In accordance with this embodiment there is provided a process for producing sulfur trioxide from a replenished circulating inventory of sulfur dioxide, which process comprises:

A) dividing a stream of gaseous $SO_2$ into a first gaseous $SO_2$ stream and a second gaseous $SO_2$ stream, adding a controlled amount of pure oxygen into the first gaseous $SO_2$ stream and concurrently and separately feeding the resultant oxygenated first gaseous $SO_2$ stream and the second gaseous $SO_2$ stream into a sulfur burner while concurrently feeding molten sulfur into the sulfur burner so that additional $SO_2$ is formed in the sulfur burner via a continuous exothermic reaction taking place in said sulfur burner, said first and second feeds reducing the temperature of the exothermic reaction in the sulfur burner, and the proportions of pure oxygen and sulfur being fed to the sulfur burner providing a gaseous exit stream of gaseous $SO_2$ and free oxygen;

B) feeding said gaseous exit stream into a catalytic $SO_3$ converter that consumes all of the incoming oxygen and converts a portion of the $SO_2$ in the converter to $SO_3$ so that an exit stream of $SO_2$ and $SO_3$ is formed in a molar ratio in the range of about 7:1 to about 25:1;

C) cooling the exit stream of $SO_2$ and $SO_3$ by indirect heat exchange with the recycle stream of gaseous $SO_2$ of A) whereby the temperature of the recycle stream of A) is increased to ensure continuous operation of the sulfur burner, and whereby a cooled exit stream of $SO_2$ and $SO_3$ is formed;

D) separating the cooled stream of $SO_2$ and $SO_3$ into a gaseous or liquid stream of $SO_3$ for recovery or use and a gaseous recycle stream of $SO_2$;

E) feeding fresh make up $SO_2$ into said gaseous recycle stream of $SO_2$ and adjusting the temperature of the resultant $SO_2$ stream by heat exchange to form the stream of gaseous $SO_2$ that is divided in A).

Another embodiment of this invention is a dual zone or two-staged sulfur burner having a hot zone and a cooler zone partially separated by one or more heat resistant baffles. The first stage hot zone in which the exothermic reaction occurs receives (i) a feed of molten sulfur which is converted into gaseous sulfur, and (ii) a feed of $SO_2$ and oxygen, the feed of $SO_2$ serving as heat sink to reduce the temperature of the exothermic reaction in the first stage hot zone, and the oxygen undergoing reaction with the sulfur to form $SO_2$. Preferably, the cooler zone which is downstream from the first stage receives one or more feeds of sulfur dioxide which also serves as a heat sink to remove additional heat from the gaseous flow proceeding toward the outlet from the sulfur en route to a catalytic sulfur trioxide converter.

These and other embodiments and features of the invention will become apparent from the ensuing description, the accompanying drawings and the appended claims.

Figure 1:
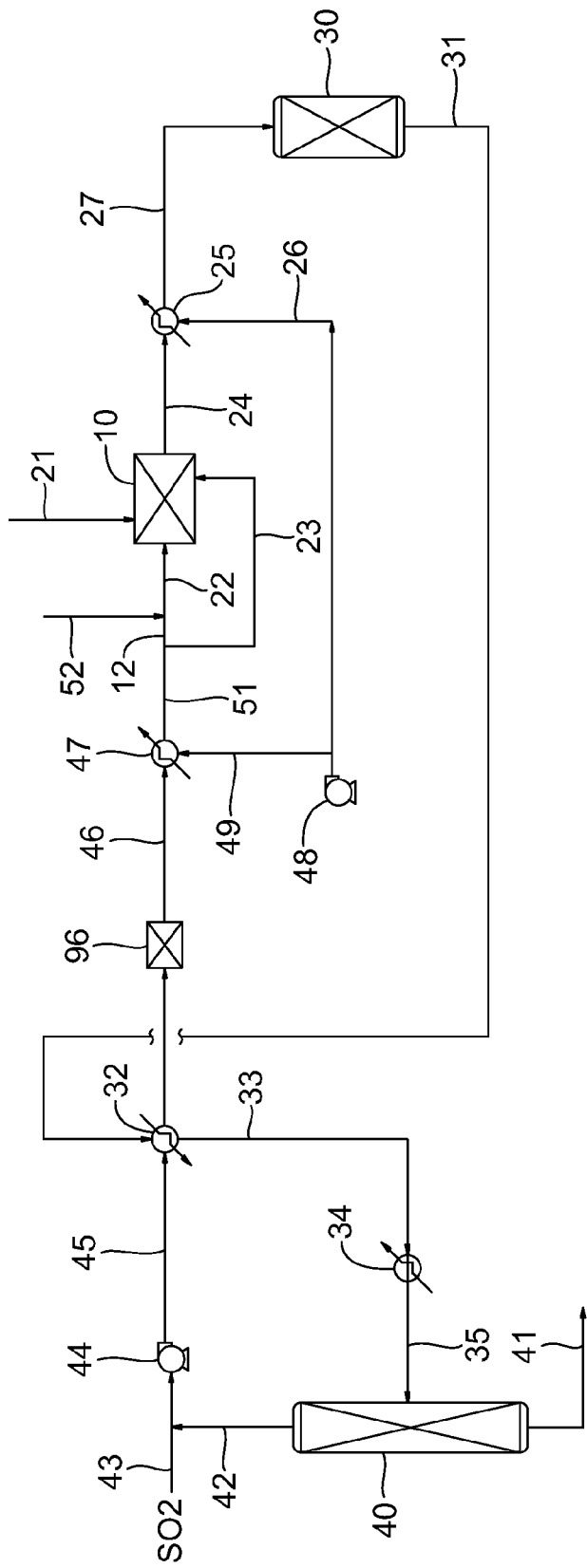
FIG. 1 is a schematic flow diagram of a process of this invention for producing $SO_2$ and $SO_3$.
Figure 1A:
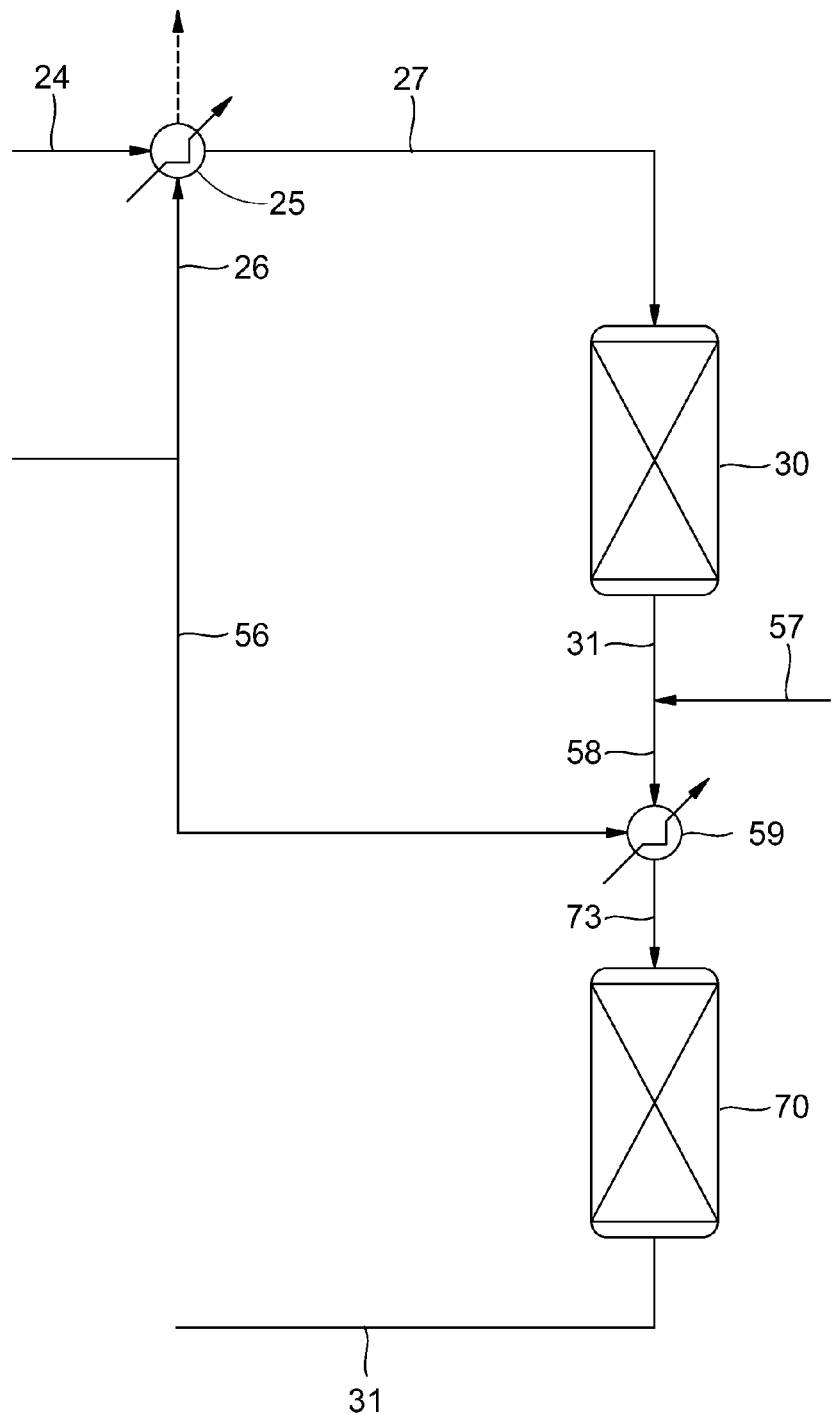
FIG. 1A is a schematic flow diagram of a portion of the flow diagram of FIG. 1 depicting the add-ons to increase the output of $SO_3$.

In connection with FIG. 1A, it should be noted that the capacity of plants utilizing this invention is dependent on recycle $SO_2$ flow rate. Sizing the equipment for increased $SO_2$ recycle flow is another way of providing more capacity.

FURTHER DETAILED DESCRIPTION

Figure 2:
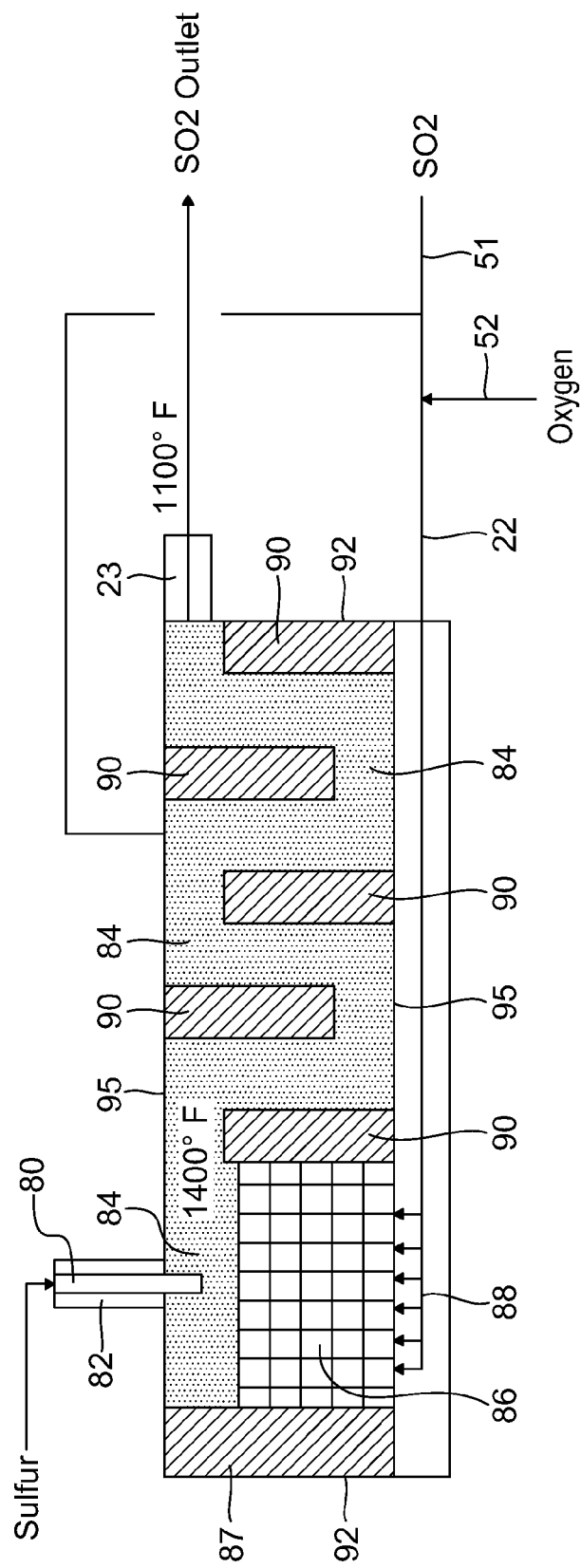
FIG. 2 is a sectional elevation view showing one arrangement of a sulfur burner of this invention.

Preferred embodiments of this invention are illustrated by FIGS. 1, 1A, and 2 of the drawings. Referring to FIG. 1, sulfur burner 10 which preferably is a two-stage burner, receives a feed of molten sulfur via line 21 into the first stage of the sulfur burner 10, preferably at the top of the burner so that the molten sulfur falls into the burner. In the embodiment shown, sulfur burner 10 also receives in the first stage, a combined feed of gaseous sulfur dioxide and pure oxygen via line 22. This feed is typically at a temperature in the range of about 300° F. to about 700° F., in order to ensure that oxidative auto-ignition of sulfur will occur within the sulfur burner. Inlet temperature can be further increased but this will negatively impact capacity. The feeds from lines 21 and 22 meet in a first stage of the sulfur burner so that the sulfur is converted into gaseous form and undergoes a highly exothermic reaction with oxygen to produce sulfur dioxide. Unless controlled as in the present invention, the temperature of this highly exothermic reaction can be as high as 2500° F. Preferably the flow from line 21 enters at the bottom of sulfur burner 10 below the incoming downward feed of molten sulfur so that the gaseous sulfur formed and pure oxygen in the flow from line 22 are flowing counter-currently. Although it is preferred to utilize a trickle or cascade sulfur burner such as depicted in FIG. 2 and atomization-type burner could also be used for delivering sulfur to the sulfur burner. However this would require a high pressure source of $SO_2$ as an atomization gas. Additionally, a supply of gaseous $SO_2$ at a temperature in the range of about 300° F. to about 700° F. is fed via line 23 into sulfur burner 10, typically into a second stage downstream from the first stage of sulfur burner 10. This feed together with the feed from line 22 serve as a heat sink within the burner so as to reduce the temperature of the normally highly exothermic reaction taking place in a conventional sulfur burner. Thus, exiting via line 24 is a mixture of sulfur dioxide and oxygen at a temperature in the range of about 750° F. to about 1400° F. which passes through a heat exchanger 25 receiving atmospheric cooling air from blower 48 via line 26 to reduce the temperature of the mixed stream of sulfur dioxide and oxygen to a temperature in the range of about 750° F. to about 1200° F. as it enters into catalytic sulfur trioxide converter 30 via line 27. Sulfur trioxide converter 30 contains a conventional catalytic system that converts sulfur dioxide into sulfur trioxide. Conventional catalyst systems typically require a minimum activation temperature of about 750° F. as the minimum inlet temperature. The quantity of oxygen in line 22 is limited so that it is completely consumed in sulfur trioxide converter. Thus, the exit stream from sulfur trioxide converter 30 is a gaseous mixture of sulfur dioxide and sulfur trioxide and this gaseous mixture is passed via line 31 into heat exchanger 32 where the temperature of this hot gaseous mixture of sulfur dioxide and sulfur trioxide is reduced from a temperature in the range of ≥750° F. to about 1400° F. to a temperature in the range of about 100° F. to about 750° F. Desirably, this cooled mixture of gases is passed via line 33 into another heat exchanger 34 to further cool the gaseous mixture to a temperature in the range of about 100° F. to about 400° F., the temperature at which this gaseous mixture enters column 40 via line 35. The column separates the two gases so that the sulfur trioxide is taken off as bottoms from the column via line 41 and the gaseous sulfur dioxide exits from the top of the column via line 42 where it merges with a separate feed of fresh sulfur dioxide gas in line 43 under a suitable superatmospheric pressure such as 100 psig.

The resultant stream of sulfur dioxide—sometimes referred to herein as the "recycle stream of gaseous $SO_2$ of A)"—after passing through blower 44 is sent via line 45 into heat exchanger 32 which increases the temperature of the stream of sulfur dioxide from in the range of about 100° F. to about 150° F. to a temperature in the range of about 725° F. to about 1100° F. The sulfur dioxide exiting heat exchanger 32 via line 46 passes through heat exchanger 47 which reduces the temperature of the sulfur dioxide from a temperature in the range of about 725° F. to about 975° F. to a desired temperature in exit line 51 in the range of about 300° F. to about 700° F., which are desirable gaseous sulfur dioxide feed temperatures for operation of sulfur burner 10. Prior to reaching feed line 22, pure oxygen is fed into line 51 via feed line 52. Heat exchanger 47 receives a flow of atmospheric cooling air via blower 48 and line 49.

For convenience, the overall flow of sulfur dioxide from line 42 which is merged with fresh $SO_2$ and passed through blower 44 and which flow is subsequently divided into two feeds before reaching sulfur burner 10 via feed lines 12 and 23, is sometimes referred to herein including the claims as the recycle stream of gaseous $SO_2$ of A).

It is to be noted that heat exchanger 32 and heat exchanger 34 are not required units for operability. However, utilization of these heat exchangers is preferable, because heat exchanger 32 reduces energy costs of operation, and heat exchanger 34 reduces the size of column 40 in which $SO_2$ and $SO_3$ are separated. Similarly, depending upon plant capacity, and whether heat exchanger 32 is included in the operation of the plant in order to reduce energy costs, heat exchanger 47 may not be required.

It is also to be noted that in the system depicted in FIG. 1 a continuous feed of fresh $SO_2$ can be used without feeding any sulfur to the system. However, such a mode of operation is not a preferred way of carrying out the process technology of this invention unless an onsite plant or an "over the fence" plant producing sufficient quantities of fresh $SO_2$ is in continuous operation at the scale required. Instead, there is another preferred way of operating a plant utilizing the present technology. In particular, once the operation of the system depicted in FIG. 1 has reached a steady-state of operation the mode of operation can be changed such that the feed of sulfur via line 21 to sulfur burner 10 can be increased in an amount sufficient to maintain continuous plant operation while at the same time shutting down the feed of fresh $SO_2$ to the system. If, in this mode of operation, it is desired to continue to operate at the same $SO_3$ production rate, the amount of sulfur fed via line 21 is increased so as to produce on combustion an amount of $SO_2$ that is equivalent to the discontinued amount of fresh $SO_2$ that was formerly fed into the system via line 43. It can also be seen therefore, that the production rate of $SO_3$ in this case can be scaled up or scaled down simply by adjusting the feed rate of the sulfur to the system.

It is also to be noted that at plant start-up, where sulfur burner is not operable until auto-ignition takes place, the combined $SO_2$ feed in line 45 of fresh $SO_2$ from line 43 and of recycle $SO_2$ from line 42 can be passed through gas burner 96 which operates on municipal gas, natural gas, propane or other source of combustible gas and which provides indirect heat to the combined $SO_2$ feed flowing through a conduit (not shown) in gas burner 96 to increase the temperature of the combined feed until it reaches the temperature necessary to achieve auto-ignition and operation of sulfur burner 10 and steady-state operation of the system. At this point, gas burner 96 can be shut down.

FIG. 1A depicts a section of the flow sheet of FIG. 1 showing the additional equipment used to increase the output of sulfur trioxide. It will be seen from FIG. 1A that line 31 leaving sulfur trioxide converter 30 receives a flow via line 57 of additional oxygen and the combined flow in line 58 enters heat exchanger 59 which receives via line 56 a flow of gaseous atmospheric oxygen from blower 48 (of FIG. 1) which cools the flow of sulfur dioxide and sulfur trioxide from a temperature in the range of from about 775° F. to about 1400° F. to a temperature in the range of about 750° F. to about 1200° F. as it enters second catalytic sulfur trioxide converter 70 via line 73, the output of which passes into line 31 at a temperature in the range of about 775° F. to about 1400° F. As in the case of the operation of catalytic sulfur trioxide converter 20, the quantity of oxygen fed to catalytic sulfur trioxide converter 70 via line 57 is limited so that it is completely consumed in sulfur trioxide converter 70. Thus, the exit stream in line 31 from sulfur trioxide converter 70 is a gaseous mixture of sulfur dioxide and sulfur trioxide. The rest of the system and the operation thereof are as described with reference to FIG. 1.

The ranges of temperatures referred to above, represent preferred temperatures for different scales of operation. Table 1 provides preferred approximate temperatures for an installation in which column 40 yields liquid or sulfur dioxide from line 42 and gaseous sulfur trioxide at the rates shown. The values shown in the right hand column of Table 1 relate to a system containing the add-on section depicted in FIG. 1A.

TABLE 1

Temperatures of Gaseous Flows in FIGS. 1 and 1A

| | Outputs of Column 40 | | |
|---|---|---|---|
| Unit | $SO_3$ @ ca 2280 lb/hr & $SO_2$ @ ca 23,280 lb/hr | $SO_3$ @ ca 3000 lb/hr & $SO_2$ @ ca 22,740 lb/hr | $SO_3$ @ ca 4200 lb/hr & $SO_2$ @ ca 22,320 lb/hr |
| Line 22 | 650° F. | 500° F. | 300° F. |
| Line 24 | 1115° F. | 1105° F. | 1140° F. |
| Line 27 | 775° F. | 775° F. | 775° F. |
| Line 31 | 1025° F. | 1100° F. | 900° F. |
| Line 33 | 350° F. | 350° F. | 350° F. |
| Line 35 | 200° F. | 200° F. | 200° F. |
| Line 45 | 130° F. | 130° F. | 130° F. |
| Line 46 | 850° F. | 950° F. | 740° F. |
| Line 51 | 650° F. | 500° F. | 300° F. |

As regards flow rates in the systems of FIG. 1 and FIG. 1A, assuming a 23,980 lb per hour recycle rate as illustrated in FIG. 1, the flow rate ranges shown in Table 2 are applicable. Increasing the $SO_2$ recycle flow rate will allow the other flow values to be increased.

TABLE 2

Rates of Gaseous Flows in FIGS. 1 and 1A

| Unit | Gaseous Flow Rate, |
|---|---|
| Line 45 | 23,980 lb/hr |
| Line 43 | 0 to 2,000 lb/hr |
| Line 21 | 0 to 600 lb/hr |
| Line 41 | 0 to 2,500 lb/hr |

Pursuant to preferred embodiments of this invention, a two-stage sulfur burner is employed. The first stage of the sulfur burner produces $SO_2$ from (a) one or more separate feeds of molten sulfur and (b) either separate feeds of pure oxygen and pure cooled recycled $SO_2$ or preferably, a combined feed of pure oxygen and pure cooled recycled $SO_2$. In the first stage of the sulfur burner the molten sulfur is converted into gaseous sulfur and as a result the sulfur reacts with the pure oxygen to produce gaseous sulfur dioxide. The oxidation of sulfur to $SO_2$ is a highly exothermic reaction. For example, 4000 btu per pound of sulfur burned is released with auto ignition taking place at temperatures of about 450° F. and above.

While the design of the two-staged burner can be varied, it is particularly preferred from the standpoints of efficiency and economic construction and operation to use a new, specially equipped trickle or cascade sulfur burner of this invention in which in the first stage, liquid sulfur flows over and downwardly into a brick lattice of the sulfur burner. Below this lattice are one or more entry ports for separately receiving upwardly directed flows of gaseous sulfur dioxide and pure oxygen or preferably, separate feeds of a mixture of gaseous sulfur dioxide and pure oxygen through the voids that exist between and among the bricks within the bed of bricks. This latter mode of feeding provides counter-current flows of the feeds and adequate time for the reactants to interact. Other advantages to the use of a sulfur burner include lack of moving parts and typically a low pressure drop within the system. Another feature of the preferred two-stage sulfur burners of this invention is the provision in the second stage, and preferably at the top of the burner, of one or more ports to receive an incoming flow of sulfur dioxide. Both this flow and the incoming upwardly directed flow(s) of gaseous sulfur dioxide serve as a heat sink to reduce the temperature released from the exothermic reaction occurring within the sulfur burner. Also, included in the sulfur burner are one or more heat resistant baffles in the downstream section of the reactor to separate the hot zone from the cold zone and to enhance mixing once the second $SO_2$ stream is added.

FIG. 2 of the drawings depicts in sectional elevation view a preferred sulfur burner 10 of this invention. Although the outer surface of the sulfur burner can vary in shape, it will typically be in the form of a cylinder optionally with a flat bottom portion (not shown). At the top of the first stage portion of the sulfur burner there is disposed a sulfur inlet tube 80 surrounded by thermal insulation 82 to receive and transmit molten sulfur through an airtight port in the upper surface wall 95 and into a free space 84. Disposed below inlet tube 80 is a bed of bricks 86 and as depicted the inlet tube is positioned to drop the molten sulfur in the direction of the upper center of the bed of bricks 86. A thick wall 87 of ceramic or other heat insulation material is disposed to the left of the bed of bricks 86. Below the bed of bricks are schematically depicted a series of inlet feed ports 88 for introducing individual upwardly directed flows of sulfur dioxide and pure oxygen. Although as shown with the inlet ports each feeding a mixture of sulfur dioxide and oxygen (which is the most desired way of providing such feeds), dual feed lines, one of sulfur dioxide, and the other of oxygen can be provided so that some of the feed ports feed sulfur dioxide and others feed pure oxygen. Fixedly attached to the inner walls is a plurality of individual heat-resistant baffles 90 which confer on free space 84 a serpentine configuration to assist in mixing the internal flow of gases into and through the second stage of sulfur burner 10. In the preferred cylindrical sulfur burner depicted in FIG. 1, the second stage is comprised of baffles 90 and the serpentine portion of the free space defined by baffles 90 and the outer cylindrical horizontal wall 95 of sulfur burner 10. Also depicted in FIG. 2 is line 23 which transmits gaseous sulfur dioxide through a port disposed in the top of the sulfur burner, line 23 being sealed around the periphery of the port in an externally airtight manner. Both ends of the depicted sulfur burner are sealed with circular vertical walls 92,92, except for a port in the wall at the downstream end of sulfur burner 10. Around the periphery of the port is sealed outlet line 24 in an externally airtight manner. Through this port and into line 24 a flow of sulfur dioxide is transmitted from the sulfur burner as schematically indicated in FIG. 1. The remainder of FIG. 2 is composed of line 51 which transmits cooled incoming sulfur dioxide, line 22 for the incoming combined feed of gaseous sulfur dioxide and pure oxygen, line 52, the feed line for pure oxygen into line 51 and line 23 which transmits $SO_2$ into the second stage of sulfur burner 10, all as schematically depicted in FIG. 1.

The sulfur trioxide converter(s) (hereinafter often referred to as "converter") can be in any position relative to ground level. A few non-limiting positions include for example horizontal, substantially horizontal, vertical, substantially vertical, upwardly inclined, downwardly inclined, and so on. In preferred embodiments the converter is in an upstanding (upright) position. Also the converter can have any shape and cross-sectional configuration that serves the purpose of enabling the process of this invention to be conducted therewith as described herein. However, it is preferred to utilize one or two vertically-disposed cylindrically-shaped converter(s) (see FIG. 1 and FIG. 1A) because of availability, cost, strength and efficiency considerations. For best results, it is desirable to use converter(s) containing fixed bed catalysts, although fluid bed catalysts may be considered for use. Also, the converter needs to be equipped with heating apparatus that will enable the catalyst to be heated (e.g., to one or more temperatures in the range of about 750° F. to about 800° F., during startup in order to cause the process to be initiated. Once initiated, the process is sufficiently exothermic as not to require addition of further heat during the course of the reaction as temperature control can be maintained by adjusting the feed rates to the converter. Although the catalyst bed is kept at one or more temperatures in the range of about 750° F. to about 1200° F. Typically, the outlet will be several hundred degrees Fahrenheit hotter than the inlet when using a fixed bed converter. In this connection, there can be zones in the catalyst bed at different temperatures within this range. In other words, the catalyst bed need not be at one and only one temperature throughout.

Since the converter is continuously exposed to internal high temperature conditions during operation and since corrosive gases are being handled and produced within the converter, it should be fabricated from suitable corrosive resistant materials. Alonized stainless steel converters and converters constructed of high nickel-content alloys serve as non-limiting examples of reactors made with suitable materials of construction.

Various types of vanadium-containing catalysts can be used in the practice of this invention provided that the catalyst has the ability to oxidize sulfur dioxide to sulfur trioxide. For example, in addition to vanadium pentoxide, modified vanadium pentoxide catalysts such as described in U.S. Pat. Nos. 3,793,230 and 4,285,927 may be used. Also, a vanadium pentoxide catalyst can be on a suitable support so that structural integrity is maintained and so that the catalyst can otherwise withstand the relatively high temperature(s) at which the bed is operated. Non-limiting examples of such supports include high temperature resistant ceramics, alumina, silica, silica alumina, zeolites, and similar materials.

Among preferred vanadium-containing catalysts used in the practice of this invention, are sulfuric acid catalysts such as are available from Monsanto Enviro-Chem as LP-120, LP-110, LP-220, T-210, T-516, T-11, Cs-120, Cs-110, Cs-210, and presumably LP-1150. According to a product brochure by Monsanto Enviro-Chem concerning such sulfuric acid catalysts and obtained from their website on Apr. 13, 2004, the LP-120, LP-110, LP-220, Cs-120, and Cs-110 are available in the shape of rings, whereas T-210, T-516, T-11, and Cs-220 are available in the shape of pellets. Dimensions of the rings and pellets are given in that brochure. Reference to LP-1150 is not made in this brochure. According to this brochure, the main components of these catalysts include SiO2 (silica as a support), vanadium (V), potassium (K), and/or cesium (Cs), and various other additives. It appears from this brochure that these catalysts may be formed from a molten salt mixture of potassium/cesium sulfates and vanadium sulfates, coated on a solid silica support. Monsanto Enviro-Chem further states that because of the unique chemistry of this molten salt system, vanadium is present as a complex sulfated salt mixture and "NOT" as vanadium pentoxide ($V_2O_5$). The brochure further states that the catalyst is more correctly called a "vanadium-containing" catalyst rather than the commonly-used "vanadium pentoxide" catalyst. It further appears from these brochures that LP-120, T-210, LP-110, and T-11 catalysts are potassium promoted, whereas Cs-120, Cs-110, and Cs-210 are cesium promoted. The cesium promoted catalysts are indicated to be more expensive, but capable of operation in a catalyst bed at lower temperatures in the range of 390-410[deg.] C. According to the material safety data sheets of Monsanto Enviro-Chem pertaining to the sulfuric acid catalysts T-516, T-210, T-11, LP-120, LP-110, LP-220, and LP-1150 have the chemical name "mixture of complex inorganic salts (oxosulfato vanadates) containing sodium, potassium, and vanadium salts on crystalline silica support. The composition of these materials is indicated to be 39-45 wt % of vanadium salt complex (no CAS No. available), 24-32 wt % of crystalline silica (CAS No. 14464-46-1), and 26-28 wt % of amorphous silica (CAS No. 68855-54-9). There is also an indication the crystalline silica may comprise cristobalite and quartz. Typical physical data for these catalysts given in the MSDS are as presented in Table 2.

TABLE 2

Physical Data for Preferred Catalysts to Convert $SO_2$ to $SO_3$

Appearance

Yellow to light green pellets
7/32" or 5/16" in diameter by [3/8]"
average length (Type 16, Type 210, Type 11)
[1/2]" or [3/8]" in diameter by [1/2]"
average length (Type LP-120, Type LP-110, Type LP-220)
[1/2]" diameter by [5/8]" long TABLE 2-continued Physical Data for Preferred Catalysts to Convert $SO_2$ to $SO_3$ Raschig Ring (Type LP-1150)
Bulk Density 1.15 lb/L (Type LP-220)
Solubility 65-75% $SiO_2$ - Insoluble
25-35% Inorganic salts - partially soluble in water
Specific Gravity Bulk ($H_2O = 1$)

0.60-0.70 (Types 516, 210, 11)
0.50-0.55 (Types LP-120, LP-110, LP-1150)

The residence time of the gases within the catalyst bed should be sufficiently high to achieve conversions to sulfur trioxide of at least about 75 mole % and typically in the range of about 97 to about 99.99 mole %. Thus limited residence times in the sulfur trioxide converter (up to 1-10 seconds) are generally sufficient. However, since residence times depend on catalyst efficiency the foregoing range should be considered as a non-limiting starting point for a few limited test evaluations in any case where a given catalyst has not been evaluated previously for use in the practice of this invention.

As noted hereinabove, the processes of this invention involve a "circulating inventory" of $SO_2$ wherein $SO_3$ is formed from a replenished circulating inventory of fresh and recycled $SO_2$. A portion of the $SO_2$ is formed in a sulfur burner which converts feeds of (i) fresh and recycled $SO_2$ and (ii) molten sulfur and pure oxygen into additional $SO_2$. The $SO_2$ from the sulfur burner, which has served as a heat sink in the sulfur burner to control the exothermic heat of reaction in the burner, is introduced into and partially converted into $SO_3$ in a catalytic $SO_3$ converter to form a mixed stream of $SO_2$ and $SO_3$. This mixed stream is passed into a column, the bottoms of which consist of the $SO_3$, the overhead being recycled $SO_2$ to which is added fresh $SO_2$ to form the feed of (i). Thus $SO_2$ passes through the entire system and in a portion of the system the $SO_2$ is in admixture with $SO_3$ which is withdrawn from the circulating inventory of $SO_2$. If desired, after the process has reached a steady state, the amount of molten sulfur and pure oxygen fed to the sulfur burner can be increased in order to further increase the amount of $SO_2$ in the system. In such case the feed of fresh $SO_2$ to replenish the feed of (i) can be reduced or terminated completely so that all of the $SO_2$ in the circulating inventory is thenceforth derived from the $SO_2$ formed in the sulfur burner.

Figure 3:
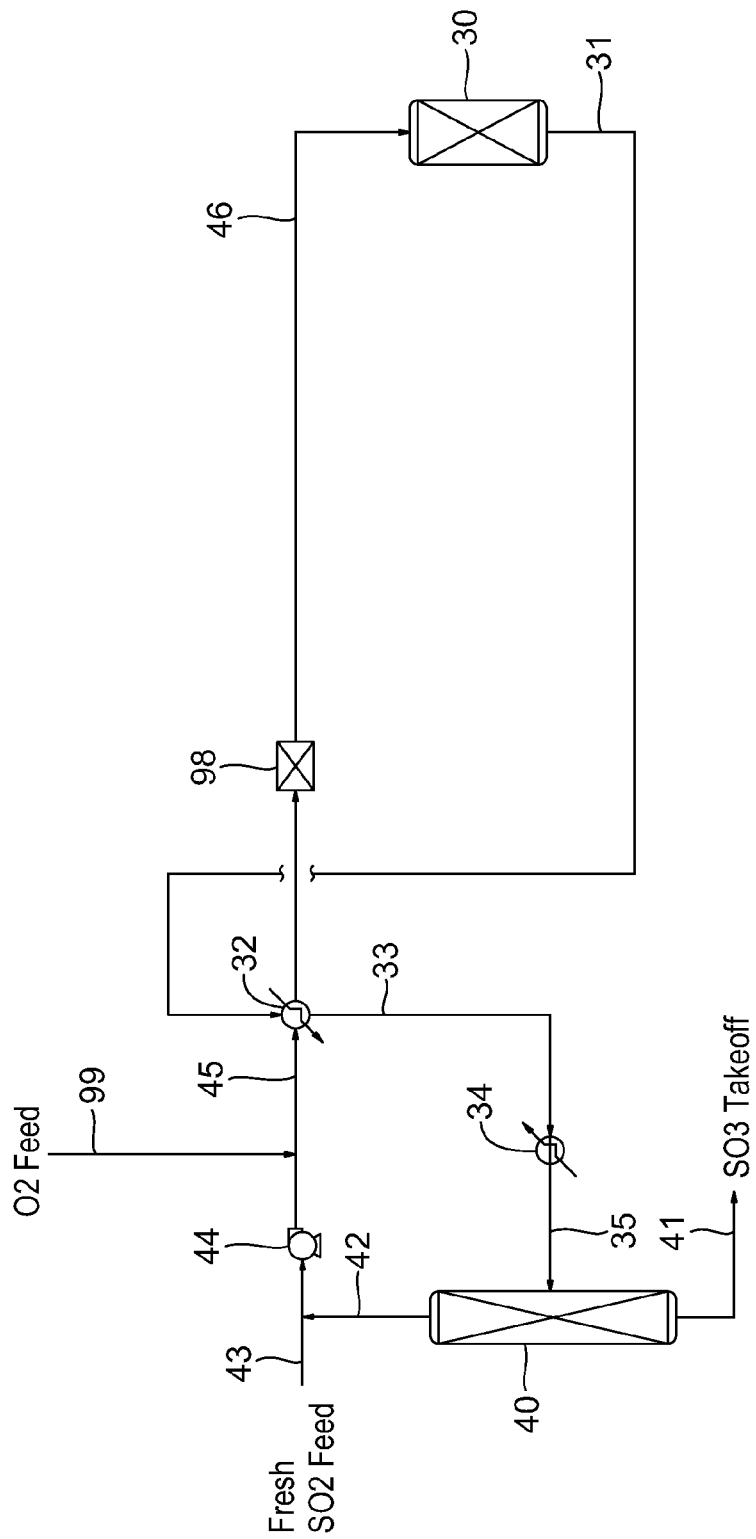
FIG. 3 is a schematic flow diagram of a prior process for producing $SO_2$ and $SO_3$.

FIG. 3 illustrates a previously-used process for producing $SO_3$ from $SO_2$. For convenience, parts or units that are common to both FIG. 1 and FIG. 3 bear the same numerical designations. Thus, the description of FIG. 3 is the same as that in FIG. 1, but only to the extent that the same numerals are applied. Thus in FIG. 3 an oxygen feed 99 occurs upstream from heat exchanger 32 and a gas burner 98 is interposed between heat exchanger 32 and 46. Gas burner 98 is utilized only for the purpose for providing heat to the $SO_2$ at plant start-ups. Otherwise, it is not in use. All the remainder of the system of FIG. 1 is absent from the system of FIG. 3.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill in the art, is thus of no practical concern.

Each and every patent or publication referred to in any portion of this specification is incorporated in toto into this disclosure by reference, as if fully set forth herein.

Except as may be expressly otherwise indicated, the article "a" or "an" if and as used herein is not intended to limit, and should not be construed as limiting, a claim to a single element to which the article refers. Rather, the article "a" or "an" if and as used herein is intended to cover one or more such elements, unless the text taken in context clearly indicates otherwise.

The invention may comprise, consist or consist essentially of the materials and/or procedures recited herein.

This invention is susceptible to considerable variation in its practice. Therefore the foregoing description is not intended to limit, and should not be construed as limiting, the invention to the particular exemplifications presented hereinabove.

The invention claimed is:

1. A process for producing sulfur trioxide from a replenished circulating inventory of sulfur dioxide, which process comprises:

A) dividing a stream of gaseous $SO_2$ into a first gaseous $SO_2$ stream and a second gaseous $SO_2$ stream, adding a controlled amount of pure oxygen into the first gaseous $SO_2$ stream and concurrently and separately feeding (i) the resultant oxygenated first gaseous $SO_2$ stream into an upstream stage of a sulfur burner having an upstream stage and a downstream stage, and (ii) the second gaseous $SO_2$ stream into the downstream stage of said sulfur burner while concurrently feeding molten sulfur into said upstream stage of the sulfur burner so that additional $SO_2$ is formed in the sulfur burner via a continuous exothermic reaction taking place in said sulfur burner, said first and second feeds reducing the temperature of the exothermic reaction in the sulfur burner, and the proportions of pure oxygen and sulfur being fed to the sulfur burner providing a gaseous exit stream of gaseous $SO_2$ and free oxygen;

B) feeding said gaseous exit stream into a catalytic $SO_3$ converter that consumes all of the incoming oxygen and converts a portion of the $SO_2$ in the converter to $SO_3$ so that an exit stream of $SO_2$ and $SO_3$ is formed in a molar ratio in the range of about 7:1 to about 25:1;

C) cooling the exit stream of $SO_2$ and $SO_3$ by indirect heat exchange with said recycle stream of gaseous $SO_2$ of A) whereby the temperature of said recycle stream of A) is increased to ensure continuous operation of the sulfur burner, and whereby a cooled exit stream of $SO_2$ and $SO_3$ is formed;

D) separating the cooled stream of $SO_2$ and $SO_3$ into a gaseous or liquid stream of $SO_3$ for recovery or use, and a gaseous recycle stream of $SO_2$;

E) feeding fresh make up $SO_2$ and/or sulfur into said gaseous recycle stream of $SO_2$ and adjusting the temperature of the resultant $SO_2$ stream by heat exchange to form the stream of gaseous $SO_2$ that is divided in A).

2. A process as in claim 1 wherein at any time after reaching steady-state operation the mode of operation is changed so that the feed of fresh make-up $SO_2$ in E) is discontinued and concurrently the feed in A) of molten sulfur is increased to a level sufficient to maintain a continued steady-state operation to produce $SO_3$ at the same, or at an increased or decreased level of production.

3. A process as in claim 2 wherein said sulfur burner is a two-stage sulfur burner wherein said upstream stage receives (i) said feed of molten sulfur at the top of the burner so that the molten sulfur falls into the upstream stage of said burner, and (ii) said feed of oxygenated first gaseous $SO_2$ stream enters at the bottom of said upstream stage of said burner below the incoming downward feed of molten sulfur so that gaseous sulfur formed and pure oxygen are flowing counter-currently in said upstream stage of said burner, and wherein said second stage provides a serpentine pathway for flow of materials therethrough.

4. A process as in claim 3 wherein said two-stage sulfur burner as a cylindrical cross-section, optionally with a flat bottom portion and wherein said serpentine downstream stage is defined by a plurality of spaced-apart, heat-resistant flanges which are alternately disposed in opposite vertical directions.

5. A process as in claim 4 wherein said sulfur burner is a trickle or cascade sulfur burner wherein in the first stage liquid sulfur is fed downwardly into a hot gas-containing free space above a brick lattice and is transformed into gaseous sulfur and wherein at least (i) one or more upwardly directed separate flows of gaseous sulfur dioxide and free oxygen and/or (ii) one or more upwardly directed flows of a mixture of gaseous sulfur dioxide and free oxygen are fed upwardly into said brick lattice so that counter-current flows of (a) sulfur and (b) free oxygen and heat absorbing gaseous $SO_2$ merge at least in part within and/or above said brick lattice.

6. A process as in claim 5 wherein the separation of $SO_2$ and $SO_3$ in D) takes place in a distillation column and wherein the indirect heat exchange in C) forming said cooled exit stream of $SO_2$ reduces the temperature of said cooled exit stream sufficiently to enable the separation of $SO_2$ and $SO_3$ to take place in said distillation column in D).

7. A process as in claim 6 wherein the temperatures of said first gaseous $SO_2$ stream and of said second gaseous $SO_3$ stream are each in the range of about 300° F. to about 700° F.

8. A process as in claim 7 wherein the temperature in the first stage of said sulfur burner is in the range of about 300° F. to about 2500° F., and the second stage temperature is in the range of 300° F. to about 1400° F. having been cooled by the introduction of the second $SO_2$ feed.

9. A process as in claim 7 wherein the feed of said gaseous exit stream into the catalytic $SO_3$ converter in B) is in the range of about 750° F. to about 1200° F. and wherein the temperature of the exit stream of $SO_2$ and $SO_3$ from the catalytic $SO_3$ converter in B) is in the range of $\geq$750° F. to about 1400° F.

10. A process as in claim 9 wherein the feed of fresh make up $SO_2$ in E) is fed under a pressure in the range of about 90 psig to about 110 psig into a blower which increases the pressure of the stream of gaseous $SO_2$ that is divided in A) is increased, with the proviso that the foregoing applies during steady-state operation until said mode of operation is changed so that the feed of fresh make-up $SO_2$ in E) is discontinued and concurrently the feed in A) of molten sulfur is increased to a level sufficient to maintain a continued steady-state operation to produce $SO_3$ at the same, or at an increased or decreased level of production.

11. A process of producing $SO_2$, which process comprises passing a stream of $SO_2$ into the first stage of a two-stage sulfur burner which is also receiving from an external source a downward flow of molten sulfur and from a separate external source an upward counter-current flow of oxygen and recycled $SO_2$ so that additional $SO_2$ is formed via an exothermic reaction in said first stage of said burner and the resultant flow of a combination of $SO_2$ and oxygen gases is transported within said burner into the second stage disposed downstream from said first stage of said burner, said second stage also receiving an external separate flow of gaseous $SO_2$ and enabling such $SO_2$ to mix with said resultant flow from the first stage whereby the temperature from the exothermic heat released in the first stage is reduced in the first and second stages by both the $SO_2$ in said upward counter-current flow of oxygen and $SO_2$ and by said separate flow of gaseous $SO_2$.

12. A process as in claim 11 wherein said first stage of said two-stage sulfur burner contains a trickle or cascade bed of bricks above which said downward molten sulfur enters said first stage and below which said upward counter-current flow of oxygen and recycled $SO_2$ enters said first stage.

13. A method for the start-up of a process of claim 1, which method comprises (1) heating a stream of fresh $SO_2$ from an external source, (2) dividing said heated stream into said first and second gaseous streams of A), (3) adding said controlled amount of pure oxygen into said first gaseous $SO_2$ stream, (4) concurrently and separately feeding the oxygenated first gaseous $SO_2$ stream and the second gaseous $SO_2$ stream into a sulfur burner so that the temperature of the gases in at least the first stage of the sulfur burner progressively heat up in temperature in the first stage, (5) initiating said feed of molten sulfur into said first stage so that when auto-ignition takes place in the first stage, the remainder of the process of claim 1 can become operational and (6) adjusting the flow of fresh $SO_2$ from said external source to provide the combination of fresh and recycled $SO_2$ that establishes and maintains said replenished circulating inventory of sulfur dioxide.

14. A method as in claim 13 wherein the first stage of said two-stage sulfur burner contains a trickle or cascade burner comprising a bed of bricks, wherein said oxygenated first gaseous $SO_2$ stream is fed upwardly from an external feed into the bottom of said bed of bricks of the trickle or cascade burner and wherein above said bed of bricks said downward flow of molten sulfur from an external feed passes into the first stage of said burner and becomes heated to gaseous form, and wherein the second stage of said two-stage sulfur burner receives from an external feed a flow of gaseous $SO_2$.

15. A method as in claim 14 wherein said two-staged burner is disposed in a substantially horizontal position and wherein said second stage of said two-stage burner contains a plurality of spaced-apart alternately upwardly and downwardly disposed baffles of heat-resistant material providing a serpentine-shaped flow path for the gases passing through and out of the second stage of said burner.

16. A trickle or cascade sulfur burner or furnace which comprises two contiguous stages defined by horizontally disposed walls and a pair of vertically disposed end plates one of which closes off the upstream end of the burner or furnace and the other of which closes off the downstream end of the burner or furnace thereby providing an enclosed space which houses said first and second stages, the first stage being upstream from the second stage, the first stage containing a bed of bricks and the second stage containing a plurality of alternating spaced-apart downwardly and upwardly disposed flanges of heat-resistant material defining a serpentine-shaped internal space for transporting gases from the first stage through the second stage and out of the second stage, and wherein at the bottom of said first stage there are one or more ports adapted to receive and admit into the bottom of said bed of bricks a continuous flow of oxygen and sulfur dioxide from an external source and the upper wall of said first stage having at least one port therein adapted to receive from an external source a downward feed of molten sulfur into a head space defined by the upper portions of said wall and the upper surface of said bed of bricks, and wherein the wall of said second stage having at least one port therein to receive a flow of sulfur dioxide from an external source, the end plate at the upstream end which closes off the upstream end of the burner or furnace having at least one port therein to receive an incoming flow of sulfur dioxide, and the end plate at the downstream end which closes off the downstream end of the burner or furnace having at least one port therein to enable the gases within the second stage to exit the burner or furnace.

17. A process as in claim 1 wherein the temperatures of said first gaseous $SO_2$ stream and of said second gaseous $SO_3$ stream are each in the range of about 300° F. to about 700° F.

18. A process as in claim 1 wherein the temperature in the first stage of said sulfur burner is in the range of about 300° F. to about 2500° F., and the second stage temperature is in the range of 300° F. to about 1400° F. having been cooled by the introduction of the second $SO_2$ feed.

19. A process as in claim 1 wherein the feed of said gaseous exit stream into the catalytic $SO_3$ converter in B) is in the range of about 750° F. to about 1200° F. and wherein the temperature of the exit stream of $SO_2$ and $SO_3$ from the catalytic $SO_3$ converter in B) is in the range of ≥750° F. to about 1400° F.

20. A process as in claim 1 wherein the feed of fresh make up $SO_2$ in E) is fed under a pressure in the range of about 90 psig to about 110 psig into a blower which increases the pressure of the stream of gaseous $SO_2$ that is divided in A) is increased, with the proviso that the foregoing applies during steady-state operation until said mode of operation is changed so that the feed of fresh make-up $SO_2$ in E) is discontinued and concurrently the feed in A) of molten sulfur is increased to a level sufficient to maintain a continued steady-state operation to produce $SO_3$ at the same, or at an increased or decreased level of production.

* * * * *